US 6,341,216 B1

United States Patent
Itoh

(10) Patent No.: US 6,341,216 B1
(45) Date of Patent: *Jan. 22, 2002

(54) TRANSMITTER-RECEIVER CIRCUIT FOR RADIO COMMUNICATION AND SEMICONDUCTOR INTEGRATED CIRCUIT DEVICE

(75) Inventor: Junji Itoh, Hirakata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/091,268

(22) PCT Filed: Dec. 17, 1996

(86) PCT No.: PCT/JP96/03682

§ 371 Date: Jun. 17, 1998

§ 102(e) Date: Jun. 17, 1998

(87) PCT Pub. No.: WO97/23053

PCT Pub. Date: Jun. 26, 1997

(30) Foreign Application Priority Data

Dec. 18, 1995 (JP) .............................................. 7-329210

(51) Int. Cl.[7] .................................................. H04B 1/48
(52) U.S. Cl. ............................ 455/83; 455/78; 455/129
(58) Field of Search ............................... 455/78, 80, 82, 455/83, 84, 89, 90, 129; 333/101, 103, 104

(56) References Cited

U.S. PATENT DOCUMENTS

| | | | | |
|---|---|---|---|---|
| 4,637,073 A | * | 1/1987 | Selin et al. ..................... | 455/78 |
| 5,442,812 A | * | 8/1995 | Ishizaki et al. ................ | 455/82 |
| 5,444,740 A | * | 8/1995 | Mizukami et al. ........... | 375/286 |
| 5,594,394 A | * | 1/1997 | Sasaki et al. ................ | 333/103 |
| 5,784,687 A | * | 7/1998 | Itoh et al. ..................... | 455/78 |

FOREIGN PATENT DOCUMENTS

| JP | 04373317 | 12/1992 |
|---|---|---|
| JP | 6-169266 | 6/1994 |
| JP | 06237101 | 8/1994 |

OTHER PUBLICATIONS

P.S. Bachert, "Wireless Antenna Interface". Applied Microwave & Wireless, pp. 24, 26, 28–30, 32 and 35, Fall 1994.

* cited by examiner

Primary Examiner—Thanh Cong Le
Assistant Examiner—Thuan T. Nguyen
(74) Attorney, Agent, or Firm—McDermott, Will & Emery

(57) ABSTRACT

A transmitter-receiver circuit for radio communication, comprising a low-noise receiver amplifier (20); a first matching circuit (40) which converts the input impedance of the amplifier (20); a transmitter amplifier (10) including a second matching circuit (50) and a third matching circuit (60) which convert the impedances to transmitting signals; and a mode switch (30) for changing from transmitting to receiving and vice versa. The transmitter amplifier (10) has a control terminal (14) connected to the gate electrode of a high-power FET (12), and the output terminal (15A) of the terminal (10) is connected to an antenna (80) not through the switch (30).

4 Claims, 11 Drawing Sheets

TRANSMITTER-RECEIVER CIRCUIT FOR RADIO COMMUNICATION AND SEMICONDUCTOR INTEGRATED CIRCUIT DEVICE

TECHNICAL FIELD

The present invention relates to a transmitter-receiver circuit and also relates to a semiconductor integrated circuit device including the transmitter-receiver circuit. More particularly, the present invention relates to transmitter-receiver circuit and semiconductor integrated circuit device suitable for a wireless communication unit using the same frequency as both transmission frequency and reception frequency.

BACKGROUND ART

In recent years, size, weight and price of various wireless communication units, e.g., portable cellular phone units for radio communication, have been drastically reduced, and the number of users thereof has been rapidly increasing. In conventional communication systems, a system configuration requiring distinct frequencies for transmission and reception has been adopted so far. On the other hand, in order to satisfy the needs of an even larger number of users, digital implementation has been gradually applied to these units. While two distinct frequencies per line have been required conventionally, such a digital wireless communication unit can perform transmission and reception with the same frequency by dividing transmission and reception in a time-division manner.

Even in such a wireless communication unit utilizing digital implementation, however, various circuits in a wireless circuit section, including a transmitter amplifier, a low-noise receiver amplifier and a transmission/reception mode switch for switching transmission and reception, are still implemented by conventional circuits. Thus, it is an important problem to develop downsized transmitter-receiver circuits and, in particular, semiconductor integrated circuit integrated with these circuits that are suitably applicable to brand-new digital implementation.

Also, a circuit including gallium-arsenide field effect transistors (hereinafter, simply referred to as "GaAs FETs"), having low-voltage, high-efficiency and low-noise operating characteristics and high-isolation characteristics, are often used for a transmitter amplifier, a low-noise receiver amplifier and a transmission/reception mode switch in a transmitter-receiver circuit for a wireless communication unit of a digital type.

Hereinafter, an example of a conventional transmitter-receiver circuit will be described with reference to the drawings.

FIG. 11 illustrates a configuration of a conventional digital transmitter-receiver circuit using FETS. In FIG. 11, 110 denotes a transmitter amplifier for amplifying an input signal to be transmitted and then outputting the amplified signal. 120 denotes a low-noise receiver amplifier for amplifying an input received signal and then outputting the amplified signal. 130 denotes a mode switch for switching transmission state and reception state in a time-division manner. 140 denotes a first matching circuit for matching the impedance of the input received signal with the input impedance of the low-noise receiver amplifier 120. 150 denotes a second matching circuit for matching the output impedance of the transmitter amplifier 110 with predetermined impedance. 160 denotes a third matching circuit for matching the output impedance of a FET 112 on the first stage with the input impedance of a FET on the second stage. 171 denotes first coupling capacitance for ac coupling the transmitter amplifier 110 with the second matching circuit 150. 172 denotes second coupling capacitance for ac coupling the mode switch 130 with the first matching circuit 140. 173 denotes a first interconnection, having characteristic impedance of 50Ω, for connecting the mode switch 130 to the second matching circuit 150. 174 denotes a second interconnection, having characteristic impedance of 50Ω, for connecting the mode switch 130 to the first matching circuit 140. 175 denotes a third interconnection, having characteristic impedance of 50Ω, for connecting the mode switch 130 to an antenna 180 used both for transmission and reception.

In the transmitter amplifier 110 shown in FIG. 11, 111 denotes an input terminal, through which a signal to be transmitted is input. 112 denotes a FET on the first stage, of which the gate electrode is provided with the input signal to be transmitted and the source is grounded. 113 denotes a first power supply terminal connected to the drain electrode of the FET 112 on the first stage. 114 denotes a FET on the second stage, of which the gate electrode is provided with the signal to be transmitted via the third matching circuit 160 and the source is grounded. 115 denotes a second power supply terminal connected to the drain electrode of the FET 114 on the second stage. 116 denotes an output terminal connected to the drain electrode of the FET 114 on the second stage.

In the low-noise receiver amplifier 120 shown in FIG. 11, 121 denotes an input terminal, through which a received signal is input via the first matching circuit 140. 122 denotes a low-noise FET, of which the gate electrode is provided with the received signal and the source is grounded. 123 denotes an output terminal connected to the drain electrode of the low-noise FET 122.

In the mode switch 130 shown in FIG. 11, 131 denotes an input terminal on the transmission side connected to the second matching circuit 150. 132 denotes an input/output terminal on the antenna side for outputting a signal to be transmitted, which has been amplified by the transmitter amplifier 110 and then input thereto via the second matching circuit 150 during transmission, to the antenna 180, and for receiving the received signal that has been received by the antenna 180 during reception. 133 denotes an output terminal on the reception side, through which the received signal input from the input/output terminal 132 on the antenna side is output. 134A denotes first switch-control-signal input terminals for controlling a first switching FET 135 and a third switching FET 137. 134B denotes second switch-control-signal input terminals for controlling a second switching FET 136 and a fourth switching FET 138.

In the first matching circuit 140 shown in FIG. 11, 141 denotes an input terminal connected to the output terminal 133 on the reception side of the mode switch 130 via the second coupling capacitance 172. 142 denotes an output terminal connected to the input terminal 121 of the low-noise receiver amplifier 120. 143 denotes a first inductor, one end of which is connected to the input terminal 141 and the other end of which is grounded, for constituting the first matching circuit 140. 144 denotes a second inductor, one end of which is connected to the input terminal 141 and the other end of which is connected to the output terminal 142, for constituting the first matching circuit 140.

In the second matching circuit 150 shown in FIG. 11, 151 denotes an input terminal connected to the output terminal 116 of the transmitter amplifier via the first coupling capacitance 171. 152 denotes an output terminal connected to the input terminal 131 on the transmission side of the mode switch 130. 153 denotes a first capacitor, one end of which is connected to the input terminal 151 and the other end of which is grounded, for constituting the second matching circuit 150. 154 denotes an inductor, one end of which is connected to the input terminal 151 and the other end of which is connected to a second capacitor 155, for constituting the second matching circuit 150. 155 denotes the second capacitor, one end of which is connected to the inductor 154 and the other end of which is connected to the output terminal 152, for constituting the second matching circuit 150.

In the third matching circuit 160 shown in FIG. 11, 161 denotes a first capacitor, one end of which is connected to the drain electrode of the FET 112 on the first stage in the transmitter amplifier 110 and the other end of which is connected to an inductor 162, for constituting the third matching circuit 160. 162 denotes the inductor, one end of which is connected to the first capacitor 161 and the other end of which is connected to the gate electrode of the FET 114 on the second stage in the transmitter amplifier 110, for constituting the third matching circuit 160. 163 denotes a second capacitor, one end of which is connected to the inductor 162 and the gate electrode of the FET 114 on the second stage and the other end of which is grounded, for constituting the third matching circuit 160.

Hereinafter, the operation of the transmitter-receiver circuit having the above-described configuration will be described.

First, the operation during reception will be described.

A less intense received signal, input via the antenna 180, passes through the third interconnection 175 having characteristic impedance of 50Ω and is input to the input/output terminal 132 on the antenna side of the mode switch 130. At this point in time, in the mode switch 130, the first switching FET 135 and the third switching FET 137 have been turned ON responsive to the control signal input through the first switch-control-signal input terminals 134A, while the second switching FET 136 and the fourth switching FET 138 have been turned OFF responsive to the control signal input through the second switch-control-signal input terminals 134B. Thus, the input signal is selectively directed to the low-noise receiver amplifier 120 via the third switching FET 137, which has been turned ON. On the other hand, the circuit section including the transmitter amplifier 110 is electrically isolated from the circuit section including the low-noise receiver amplifier 120, because the second switching FET 136 has been turned OFF. Also, the former circuit section is short-circuited, because the first switching FET 135 has been turned ON.

The signal switched by the third switching FET 137 in the conductive state is output through the output terminal on the reception side of the mode switch 130, passed through the second interconnection 174 having characteristic impedance of 50Ω and the second coupling capacitance 172 and then input to the first matching circuit 140. Then, impedance matching is performed by the first inductor 143 and the second inductor 144 of the first matching circuit 140. Thereafter, the signal is input to the input terminal 121 of the low-noise receiver amplifier 120. The received signal input to the low-noise receiver amplifier 120 is amplified by the low-noise FET 122 and the amplified signal is output through the output terminal 123.

Next, the operation during transmission will be described.

First, modulated signal to be transmitted is input to the input terminal Ill of the transmitter amplifier 110. Power amplification on the first stage is performed by the FET 112 on the first stage. Impedance conversion is performed by the third matching circuit 160. Then, the signal is input to the FET 114 on the second stage. The power of the signal is amplified by the FET 114 on the second stage so as to reach predetermined power. The amplified signal to be transmitted is input to the second matching circuit 150 via the first coupling capacitance 171. The characteristic impedance thereof is converted to be 50Ω. And then the signal is input to the input terminal 131 on the transmission side of the mode switch 130 through the first interconnection 173 having characteristic impedance of 50Ω.

At this point in time, in the mode switch 130, the second switching FET 136 and the fourth switching FET 138 have been turned ON responsive to the control signal input through the second switch-control-signal input terminals 134B, while the first switching FET 135 and the third switching FET 137 have been turned OFF responsive to the control signal input through the first switch-control-signal input terminals 134A. Thus, the input signal to be transmitted is selectively directed to the antenna 180 via the second switching FET 136, which has been turned ON. On the other hand, the circuit section including the low-noise receiver amplifier 120 is electrically isolated from the circuit section including the transmitter amplifier 110, because the third switching FET 137 has been turned OFF. Also, the former circuit section is short-circuited, because the fourth switching FET 138 has been turned ON.

The amplified signal to be transmitted passes through the second switching FET 136 in the conductive state and the third interconnection 175 having characteristic impedance of 50Ω and is input to the antenna 180 so as to be output through the antenna 180 as radio waves.

The above-described conventional transmitter-receiver circuit, however, had a problem in that the loss of a signal passing through the mode switch 130 is large. In particular, the loss of a signal to be transmitted becomes an issue because such a signal requires high power. Thus, it is necessary to improve the performance of a through switching FET on the transmission side. In general, in order to reduce the pass loss, a switching FET having a large gate length is required. In addition, if switching FETs of such a large size are integrated, then the chip area is increased to such a degree that the area occupied by the mode switch 130 becomes substantially equal to the area of the transmitter amplifier 110. Thus, problems are present in that downsizing and cost-reduction thereof are hard to realize.

The present invention can solve the above-described conventional problems all at once, and has objects of reducing the power consumption by eliminating the pass loss caused by the mode switch on the signal to be transmitted and downsizing a wireless communication unit by reducing the area occupied by the mode switch in the transmitter-receiver circuit.

DISCLOSURE OF THE INVENTION

In order to accomplish the above-described objects, the present invention connects a transmitter amplifier to an antenna without interposing any mode switch therebetween by matching the inputs to a receiver amplifier while using, in combination, the output impedance of the transmitter amplifier during the OFF state and the output impedance to the receiver amplifier.

A transmitter-receiver circuit for a wireless communication unit according to the present invention includes: a transmitter amplifier for amplifying and outputting an input signal to be transmitted; a receiver amplifier for amplifying and outputting an input received signal; and a mode switch, connected to an antenna used for both transmission and reception, for switching a transmission state where the signal to be transmitted, which has been output by the transmitter amplifier, is output to the antenna and a reception state where the received signal, to be input to the receiver amplifier, is input through the antenna. The transmitter amplifier includes: an amplifying FET, having a gate electrode connected to an input terminal of the signal to be transmitted, a drain electrode connected to a power supply terminal and a source electrode grounded; a matching circuit, connected between the drain electrode of the FET and the antenna, for matching output impedance of the FET with impedance on the antenna side; a control terminal connected to the gate electrode of the FET; and an output terminal directly connected to the antenna without passing through the mode switch.

In the transmitter-receiver circuit for a wireless communication unit, since the output terminal of the transmitter amplifier is directly connected to the antenna without passing through the mode switch during transmission, the pass loss, ordinarily caused by a switch on a signal to be transmitted, can be eliminated. As a result, the power consumption can be reduced. On the other hand, during reception, since a control terminal connected to the gate electrode of the FET of the transmitter amplifier is provided, the circuit section on the transmission side is short-circuited by applying a predetermined voltage to the gate electrode and using the FET having the grounded source as resistance. As a result, a mode switch on the transmission side, which has conventionally been required, is no longer necessary. In other words, a mode switch on the reception side may be constituted by only one switching device, and thus the area occupied by the mode switch in the entire circuit can be reduced. As a result, the overall size of the transmitter-receiver circuit can be reduced.

Another transmitter-receiver circuit for a wireless communication unit according to the present invention includes: a transmitter amplifier for amplifying and outputting an input signal to be transmitted; a receiver amplifier for amplifying and outputting an input received signal; and a mode switch, connected to an antenna used for both transmission and reception, for switching a transmission state where the signal to be transmitted, which has been output by the transmitter amplifier, is output to the antenna and a reception state where the received signal, to be input to the receiver amplifier, is input through the antenna. The transmitter amplifier includes: an amplifying FET, having a gate electrode connected to an input terminal of the signal to be transmitted, a drain electrode connected to a power supply terminal and a source electrode grounded; a matching circuit, connected between the drain electrode of the FET and the antenna, for matching output impedance of the FET with impedance on the antenna side; a control terminal connected to the gate electrode of the FET; and an output terminal directly connected to the antenna without passing through the mode switch. The input terminal on the antenna side of the mode switch is connected to a terminal of the matching circuit, which is different from the output terminal of the signal to be transmitted of the matching circuit.

In the transmitter-receiver circuit for a wireless communication unit, since the output terminal of the transmitter amplifier is directly connected to the antenna without passing through the mode switch during transmission, the pass loss, ordinarily caused by a switch on a signal to be transmitted, can be eliminated. As a result, the power consumption can be reduced. On the other hand, during reception, since a control terminal connected to the gate electrode of the FET of the transmitter amplifier is provided, the circuit section on the transmission side is short-circuited by applying a predetermined voltage to the gate electrode and using the FET having the grounded source as resistance. As a result, a mode switch on the transmission side, which has conventionally been required, is no longer necessary. In other words, a mode switch on the reception side may be constituted by only one switching device, and thus the area occupied by the mode switch in the entire circuit can be reduced. As a result, the overall size of the transmitter-receiver circuit can be reduced. Moreover, where a receiving matching circuit for matching the impedance of the received signal with the input impedance of the receiver amplifier is provided between the mode switch and the receiver amplifier, a terminal allowing for optimization of the circuit constant of the receiving matching circuit can be selected. As a result, since the design flexibility of the receiving matching circuit can be increased, the size of the receiving matching circuit can be reduced.

A semiconductor integrated circuit device according to the present invention, includes: a semiconductor substrate; a transmitter amplifier, formed on the semiconductor substrate, for amplifying and outputting an input signal to be transmitted; a receiver amplifier, formed on the semiconductor substrate, for amplifying and outputting an input received signal; and a mode switch, formed on the semiconductor substrate and connected to an input/output terminal on an antenna side used for both transmission and reception, for switching a transmission state where the signal to be transmitted, which has been output by the transmitter amplifier, is output to the input/output terminal on the antenna side and a reception state where the received signal, to be input to the receiver amplifier, is input through the input/output terminal on the antenna side. The transmitter amplifier includes: an amplifying FET, having a gate electrode connected to an input terminal of the signal to be transmitted, a drain electrode connected to a power supply terminal and a source electrode grounded; a matching circuit, connected between the drain electrode of the FET and the input/output terminal on the antenna side, for matching output impedance of the FET with impedance on the antenna side; a control terminal connected to the gate electrode of the FET; and an output terminal directly connected to the input/output terminal on the antenna side without passing through the mode switch.

In the semiconductor integrated circuit device, since the output terminal of the transmitter amplifier is directly connected to the input/output terminal on the antenna side without passing through the mode switch during transmission, the pass loss, ordinarily caused by a switch on a signal to be transmitted, can be eliminated. As a result, the power consumption can be reduced. On the other hand, during reception, since a control terminal connected to the gate electrode of the FET of the transmitter amplifier is provided, the circuit section on the transmission side is short-circuited by applying a predetermined voltage to the gate electrode and using the FET as resistance. As a result, a mode switch on the reception side may be constituted by only one switching device, and thus the area occupied by the mode switch in the entire circuit can be reduced. Consequently, features advantageous for high integration can be attained and the device can be downsized.

Another semiconductor integrated circuit device according to the present invention includes: a semiconductor substrate; a transmitter amplifier, formed on the semiconductor substrate, for amplifying and outputting an input signal to be transmitted; a receiver amplifier, formed on the semiconductor substrate, for amplifying and outputting an input received signal; and a mode switch, formed on the semiconductor substrate and connected to an input/output terminal on an antenna side used for both transmission and reception, for switching a transmission state where the signal to be transmitted, which has been output by the transmitter amplifier, is output to the input/output terminal on the antenna side and a reception state where the received signal, to be input to the receiver amplifier, is input through the input/output terminal on the antenna side. The transmitter amplifier includes: an amplifying FET, having a gate electrode connected to an input terminal of the signal to be transmitted, a drain electrode connected to a power supply terminal and a source electrode grounded; a matching circuit, connected between the drain electrode of the FET and the input/output terminal on the antenna side, for matching output impedance of the FET with impedance on the antenna side; a control terminal connected to the gate electrode of the FET; and an output terminal directly connected to the input/output terminal on the antenna side without passing through the mode switch. The input terminal on the antenna side of the mode switch is connected to a terminal of the matching circuit, which is different from the output terminal of the signal to be transmitted of the matching circuit.

In the semiconductor integrated circuit device, since the output terminal of the transmitter amplifier is directly connected to the input/output terminal on the antenna side without passing through the mode switch during transmission, the pass loss, ordinarily caused by a switch on a signal to be transmitted, can be eliminated. As a result, the power consumption can be reduced. On the other hand, during reception, since a control terminal connected to the gate electrode of the FET of the transmitter amplifier is provided, the circuit section on the transmission side is short-circuited by applying a predetermined voltage to the gate electrode and using the FET as resistance. As a result, a mode switch on the transmission side is no longer necessary. In other words, a mode switch on the reception side may be constituted by only one switching device, and thus the area occupied by the mode switch in the entire circuit can be reduced. Moreover, where a receiving matching circuit for matching the impedance of the received signal with the input impedance of the receiver amplifier is provided between the mode switch and the receiver amplifier, a terminal allowing for optimization of the circuit constant of the receiving matching circuit can be selected. As a result, since the design flexibility of the receiving matching circuit can be increased, the size of the receiving matching circuit can be reduced. Consequently, the size of the device can be further reduced.

BEST MODE FOR CARRYING OUT THE INVENTION

First Embodiment

Hereinafter, the first embodiment of the present invention will be described with reference to the drawings.

Figure 1:
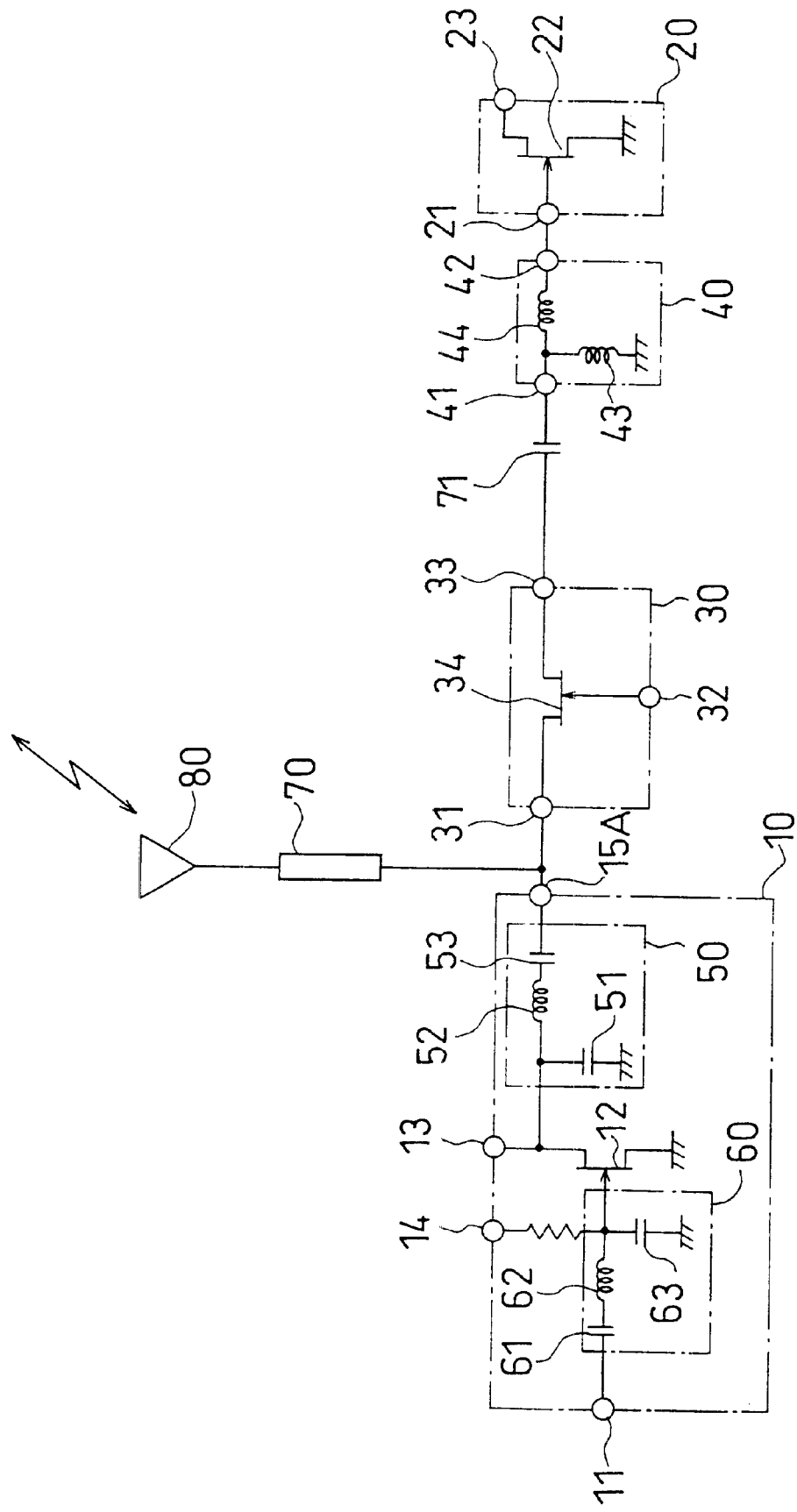
FIG. 1 is a circuit diagram of a transmitter-receiver circuit for a wireless communication unit according to the first embodiment of the present invention.

FIG. 1 is a circuit diagram of a transmitter-receiver circuit for a wireless communication unit according to the first embodiment of the present invention. In FIG. 1, 10 denotes a transmitter amplifier for amplifying an input signal to be transmitted and then outputting the amplified signal. 20 denotes a low-noise receiver amplifier for amplifying an input received signal and then outputting the amplified signal. 30 denotes a mode switch for switching transmission state and reception state in a time-division manner. 40 denotes a first matching circuit for matching the impedance of the input received signal with the input impedance of the low-noise receiver amplifier 20. 50 denotes a second matching circuit for matching the output impedance of the transmitter amplifier 10 with predetermined impedance. 60 denotes a third matching circuit for matching the impedance of the input signal to be transmitted with the input impedance of a high-power FET 12 of the transmitter amplifier 10. 70 denotes an interconnection, having characteristic impedance of 50Ω, for connecting the mode switch 30, the transmitter amplifier 10 and an antenna 80 used for both transmission and reception with each other. 71 denotes coupling capacitance for ac coupling the mode switch 30 to the first matching circuit 40.

In the transmitter amplifier 10 shown in FIG. 1, 11 denotes an input terminal, through which a signal to be transmitted is input. 12 denotes a high-power FET, of which the gate electrode is provided with the input signal to be transmitted via the third matching circuit 60 and the source is grounded. 13 denotes a power supply terminal connected to the drain electrode of the high-power FET 112. 14 denotes a control terminal connected to the gate electrode of the high-power FET 12 via resistance. 15A denotes an output terminal connected to the antenna 80 through an interconnection 70 having characteristic impedance of 500 and to an input terminal 31 of the mode switch 30.

In the low-noise receiver amplifier 20 shown in FIG. 1, 21 denotes an input terminal, through which a received signal is input via the first matching circuit 40. 22 denotes a low-noise FET, of which the gate electrode is provided with the received signal and the source is grounded. 23 denotes an output terminal connected to the drain electrode of the low-noise FET 22.

In the mode switch 30 shown in FIG. 1, 31 denotes an input terminal connected to the antenna 80 through the interconnection 70 having characteristic impedance of 50Ω and to the output terminal 15A of the transmitter amplifier 10. 32 denotes a switch-control-signal input terminal for controlling a switching FET 34. 33 denotes an output terminal, through which the received signal, input through the antenna 80, is output.

In the first matching circuit 40 shown in FIG. 1, 41 denotes an input terminal connected to the output terminal 33 of the mode switch 30 via the coupling capacitance 71. 42 denotes an output terminal connected to the input terminal 21 of the low-noise receiver amplifier 20. 43 denotes a first inductor, one end of which is connected to the input terminal 41 and the other end of which is grounded, for constituting the first matching circuit 40. 44 denotes a second inductor, one end of which is connected to the input terminal 41 and the other end of which is connected to the output terminal 42, for constituting the first matching circuit 40.

In the second matching circuit 50 shown in FIG. 1, 51 denotes a first capacitor, one end of which is connected to the drain electrode of the high-power FET 12 and the other end of which is grounded, for constituting the second matching circuit 50. 52 denotes an inductor, one end of which is connected to the drain electrode of the high-power FET 12 and the other end of which is connected to a second capacitor 53, for constituting the second matching circuit 50. 53 denotes a second capacitor, one end of which is connected to the inductor 52 and the other end of which is connected to the output terminal 15A, for constituting the second matching circuit 50.

In the third matching circuit 60 shown in FIG. 1, 61 denotes a first capacitor, one end of which is connected to the input terminal 11 of the transmitter amplifier 10 and the other end of which is connected to an inductor 62, for constituting the third matching circuit. 62 denotes the inductor, one end of which is connected to the first capacitor 61 and the other end of which is connected to the gate electrode of the high-power FET 12 of the transmitter amplifier 10, for constituting the third matching circuit 60. 63 denotes a second capacitor, one end of which is connected to the inductor 62 and the gate electrode of the high-power FET 12 and the other end of which is grounded, for constituting the third matching circuit.

In this embodiment, the FETs constituting the transmitter amplifier 10, the low-noise receiver amplifier 20 and the mode switch 30 are assumed to be GaAs FETs or silicon MOSFETs.

Hereinafter, the operation of the transmitter-receiver circuit having the above-described configuration will be described with reference to FIGS. 1 and 2.

Figure 2:
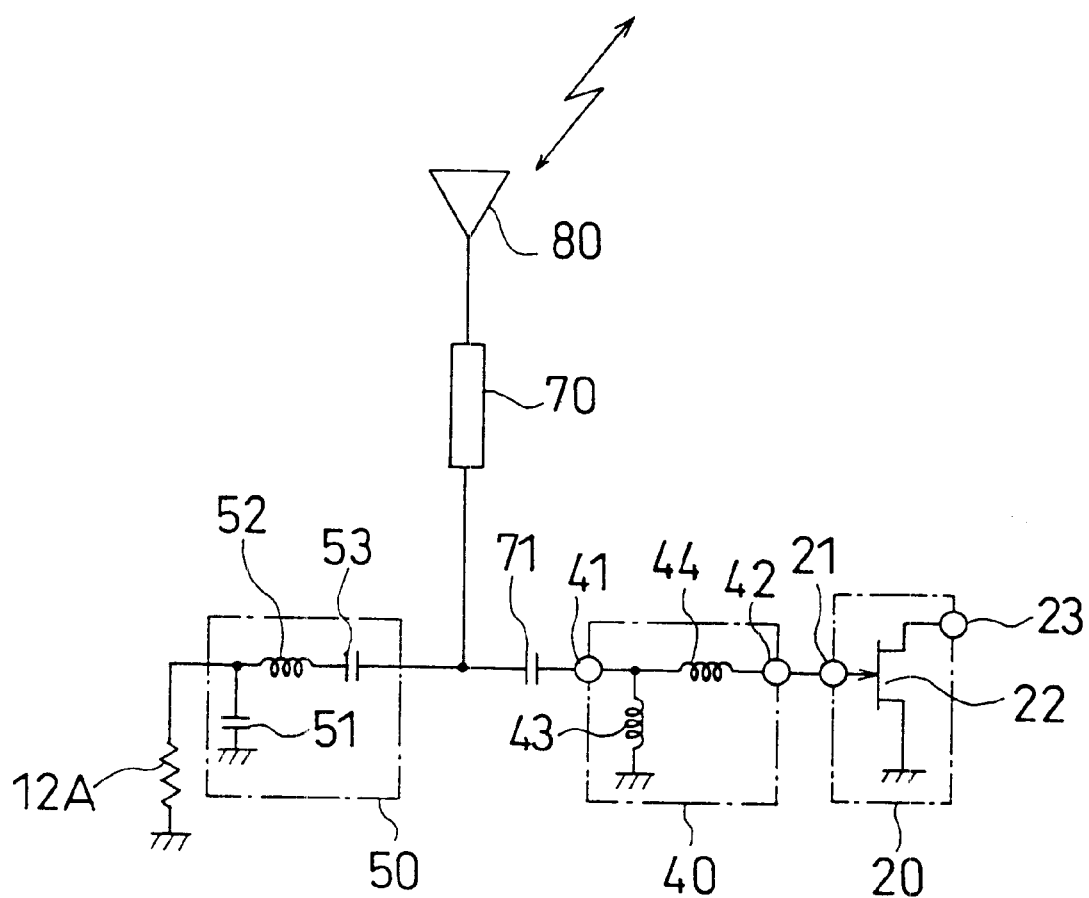
FIG. 2 is an equivalent circuit diagram where the transmitter-receiver circuit for a wireless communication unit according to the first embodiment of the present invention performs receiving operation.

FIG. 2 is an equivalent circuit diagram where the transmitter-receiver circuit for a wireless communication unit according to the first embodiment of the present invention performs receiving operation. In FIG. 2, the same components as those of the transmitter-receiver circuit shown in FIG. 1 are identified by the same reference numerals and the description thereof will be omitted herein.

First, the operation thereof during reception will be described.

As shown in FIG. 1, a less intense received signal, which has been input through the antenna 80, passes-through the interconnection 70 having characteristic impedance of 50Ω and is input to the mode switch 30.

In the mode switch 30, the switching FET 34 has been turned ON responsive to the control signal input through the switch-control-signal input terminal 32. Thus, the input received signal is next passed through the switching FET 34, the output terminal 33 of the mode switch 30 and the coupling capacitance 71 so as to be input to the first matching circuit 40.

Subsequently, the impedance of the input received signal is matched with the input impedance of the low-noise receiver amplifier 20. Thereafter, the signal is input to the input terminal 21 of the low-noise receiver amplifier 20. At this point in time, by turning ON the high-power FET 12 upon the application of a control voltage to the control terminal 14 of the high-power FET 12 in the transmitter amplifier 10, the high-power FET 12 can be equivalent to pure resistance 12A as shown in FIG. 2. Thus, the circuit section on the transmission can be short-circuited during reception. Accordingly, the input impedance of the low-noise receiver amplifier 20 can be matched by the first inductor 43 and the second inductor 44 constituting the first matching circuit 40 and the inductor 52 constituting the second matching circuit 50.

Next, the received signal input to the low-noise receiver amplifier 20 is amplified by the low-noise FET 22 and then output through the output terminal 23 of the low-noise receiver amplifier 20.

It is noted that, if the transmitter amplifier 10 performs multiple-stage amplification using a plurality of FETs, the control terminal 14 may be provided for the FET on the last amplification stage.

Next, the operation thereof during transmission will be described with reference to FIG. 1.

First, a signal to be transmitted, which has been modulated and amplified to reach a predetermined signal level, is input to the input terminal 11 of the transmitter amplifier 10. Then, after the impedance of the input signal to be transmitted is matched by the third matching circuit 60 with the input impedance of the high-power FET 12, the input signal to be transmitted is amplified by the high-power FET 12 to gain predetermined power.

Subsequently, after having been subjected to the impedance conversion by the second matching circuit 50, the amplified signal to be transmitted is passed through the interconnection 70 having characteristic impedance of 50Ω, input to the antenna 80 and then output by the antenna 80 as radio waves. Since the switching FET 34 is turned OFF in the mode switch 30, the circuit section on the reception side is isolated from the antenna 80 and the transmitter amplifier 10.

This embodiment is characterized in that the transmitter amplifier 10 can be connected to the antenna 80 without interposing any switch therebetween by matching the inputs to the low-noise receiver amplifier 20 using the output impedance of the transmitter amplifier 10 during the OFF state and the output impedance of the first matching circuit 40 to the low-noise receiver amplifier 20. Thus, since the switch for transmission need not be used, the pass loss caused by a switching device on the output signal of the transmitter amplifier 10 can be eliminated. As a result, low power consumption is realized during transmission.

In addition, since only one switching FET is necessary, the mode switch can have a reduced area and can be integrated more highly.

The value of resistance where the control terminal 14 of the high-power FET 12 is used as having been turned ON by applying a voltage to the control terminal 14 during the transmission OFF state is equal to or lower than 1Ω, which is the ON resistance of a generally used FET. Thus, the influence of the resistance on the input matching of the low-noise receiver amplifier 20 is negligible.

Second Embodiment

Hereinafter, the second embodiment of the present invention will be described with reference to the drawings.

Figure 3:
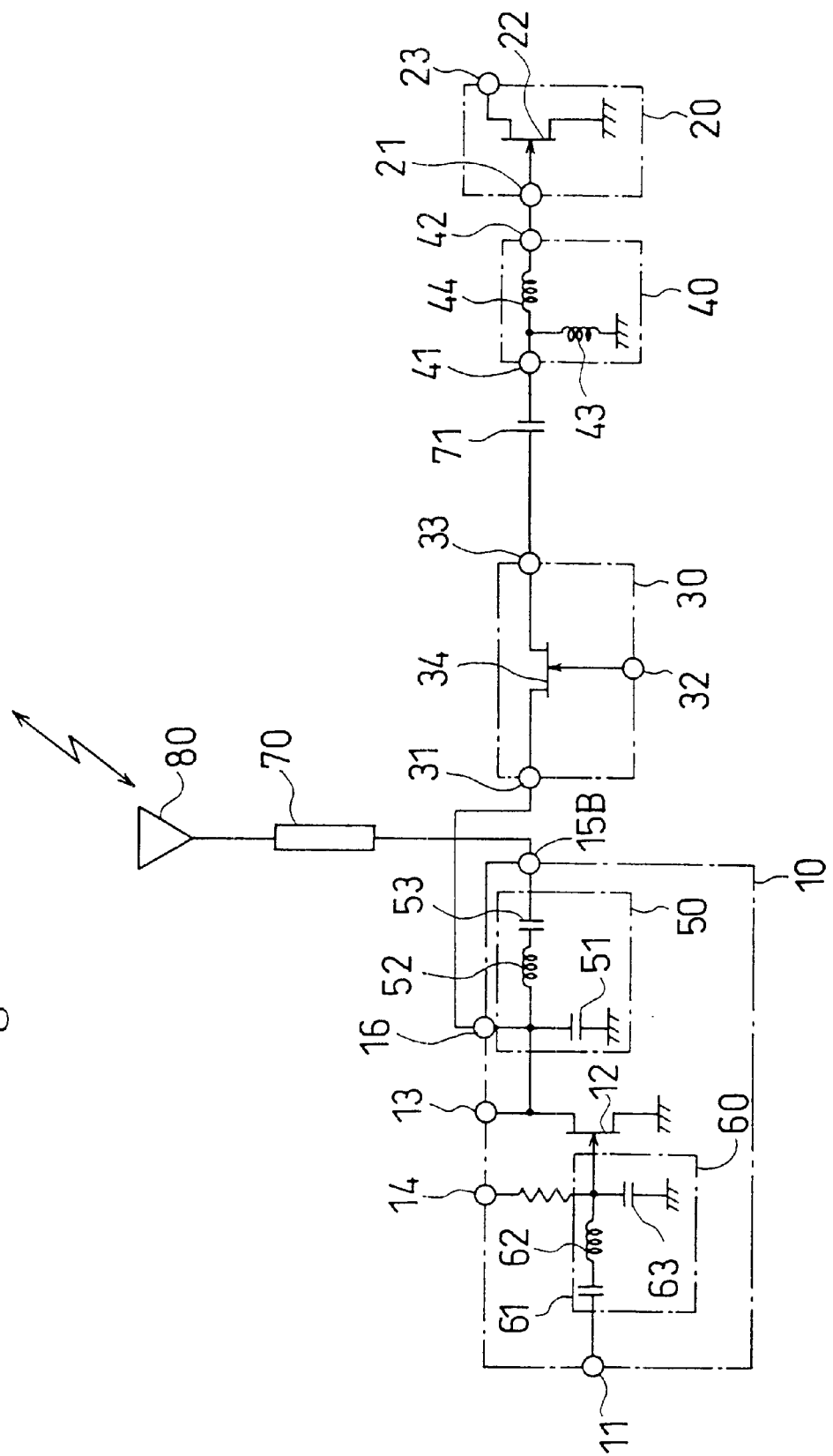
FIG. 3 is a circuit diagram of a transmitter-receiver circuit for a wireless communication unit according to the second embodiment of the present invention.

FIG. 3 is a circuit diagram of a transmitter-receiver circuit for a wireless communication unit according to the second embodiment of the present invention. In FIG. 3, 10 denotes a transmitter amplifier for amplifying an input signal to be transmitted and then outputting the amplified signal. 20 denotes a low-noise receiver amplifier for amplifying an input received signal and then outputting the amplified signal. 30 denotes a mode switch for switching transmission state and reception state in a time-division manner. 40 denotes a first matching circuit for matching the impedance of the input received signal with the input impedance of the low-noise receiver amplifier 20. 50 denotes a second matching circuit for matching the output impedance of the transmitter amplifier 10 with predetermined impedance. 60 denotes a third matching circuit for matching the impedance of the input signal to be transmitted with the input impedance of a high-power FET 12 of the transmitter amplifier 10. 70 denotes an interconnection, having characteristic impedance of 50Ω, for connecting a terminal 15B functioning as output terminal for transmission and input terminal for reception of the transmitter amplifier 10 to the antenna 80 used for both transmission and reception. 71 denotes coupling capacitance for ac coupling the mode witch 30 to the first matching circuit 40. In FIG. 3, the same components as those of the circuits shown in FIG. 1 are identified by the same reference numerals and the description thereof will be omitted herein.

This embodiment is different from the first embodiment in that the input terminal 31 of the mode switch 30 is connected not to the terminal 15B functioning as output terminal for transmission and input terminal for reception of the transmitter amplifier 10, but to an output terminal 16 of the received signal. The output terminal 16 is used in common both as a terminal of the drain electrode of the high-power FET 12 and as a non-grounded terminal of the first capacitor 51 in the second matching circuit 50.

Hereinafter, the operation of the transmitter-receiver circuit having the above-described configuration will be described with reference to FIGS. 3 and 4.

The operation thereof during transmission is the same as that of the transmitter-receiver circuit described in the first embodiment, and thus the description thereof will be omitted herein. Only the operation thereof during reception will be described hereinafter.

Figure 4:
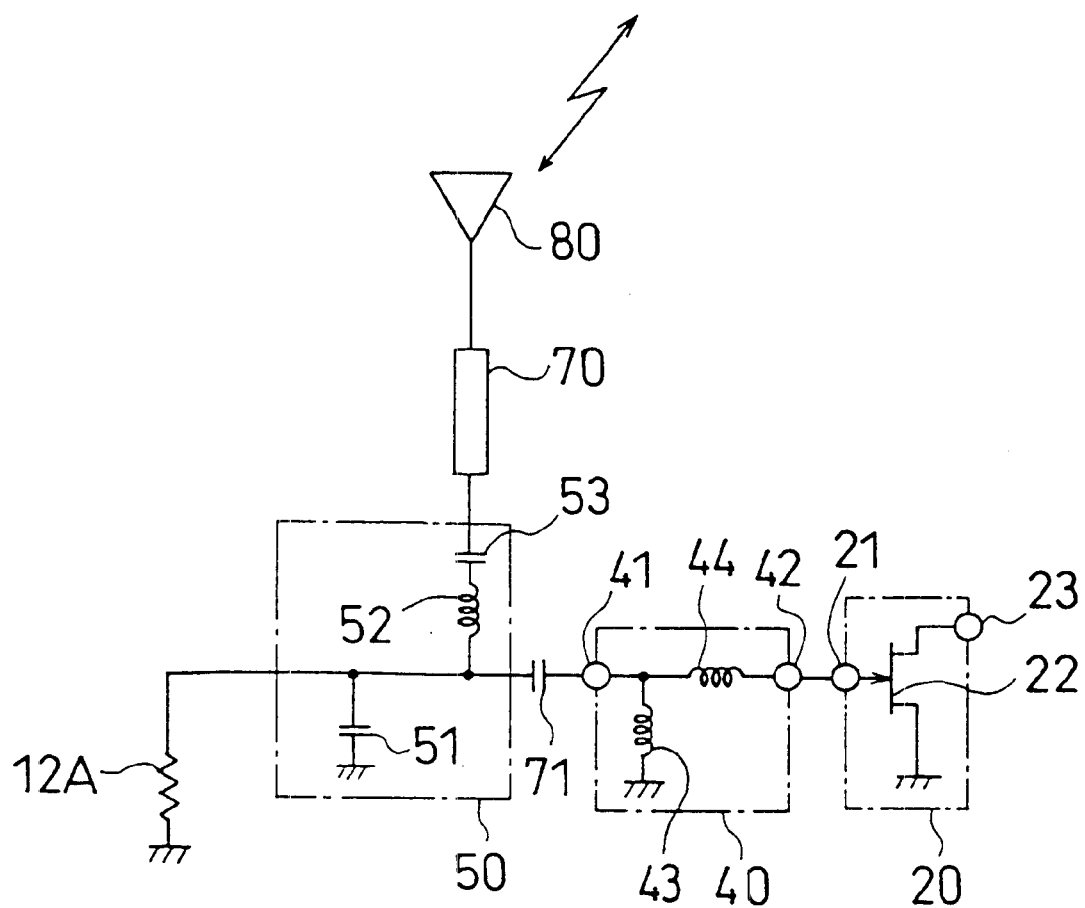
FIG. 4 is an equivalent circuit diagram where the transmitter-receiver circuit for a wireless communication unit according to the second embodiment of the present invention performs receiving operation.
Figure 5A:
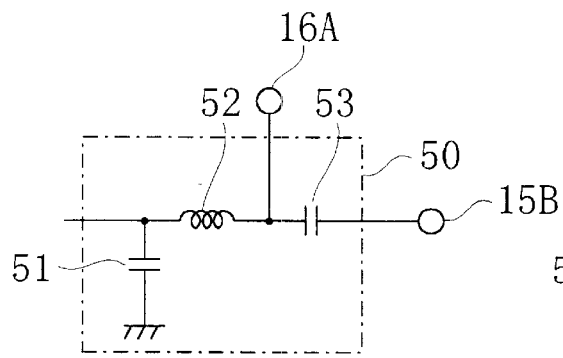
FIGS. 5(a) through 5(d) are circuit diagrams illustrating variations of a second matching circuit and an output terminal of a received signal in the transmitter-receiver circuit for a wireless communication unit according to the second embodiment of the present invention.
Figure 5B:
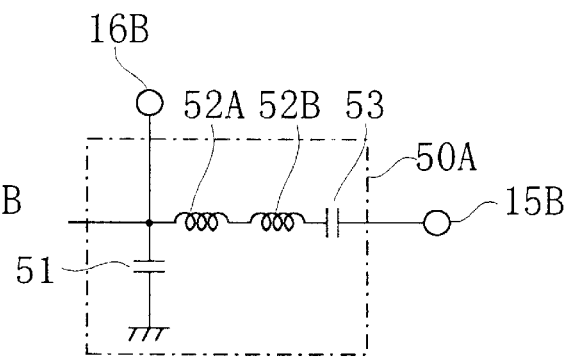
Figure 5C:
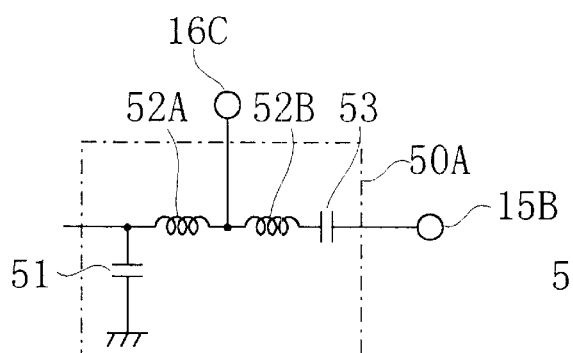
Figure 5D:
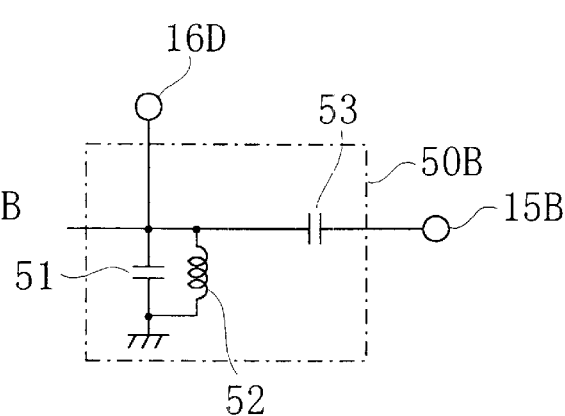
Figure 6A:
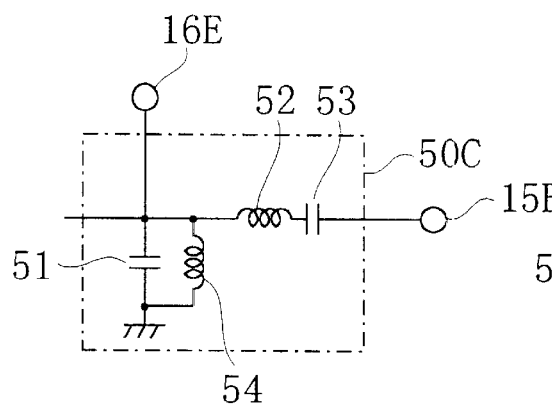
FIGS. 6(a) through 6(d) are circuit diagrams illustrating variations of the second matching circuit and the output terminal of the received signal in the transmitter-receiver circuit for a wireless communication unit according to the second embodiment of the present invention.
Figure 6B:
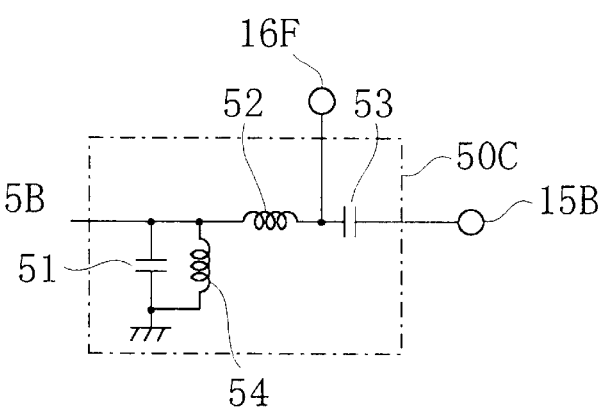
Figure 6C:
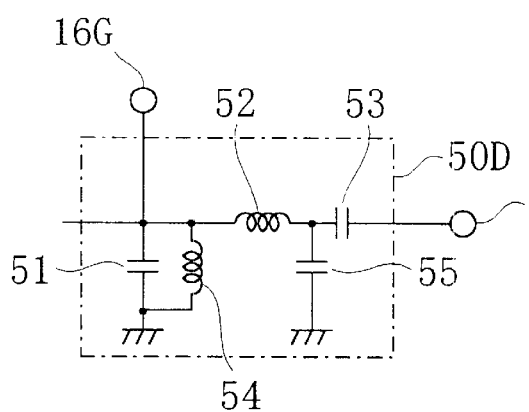
Figure 6D:
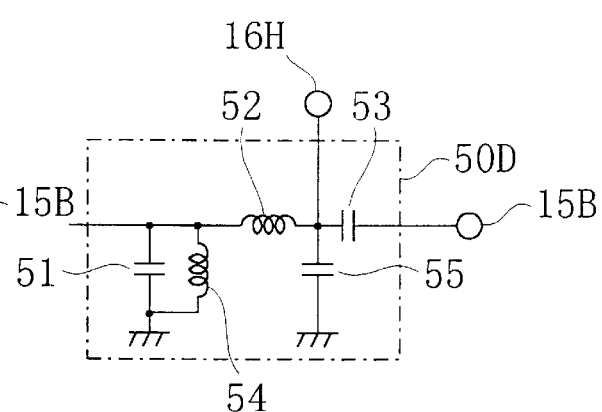

FIG. 4 is an equivalent circuit diagram where the transmitter-receiver circuit for a wireless communication unit according to the second embodiment performs receiving operation.

First, as shown in FIG. 3, a less intense received signal, which has been input through the antenna 80, passes through the interconnection 70 having characteristic impedance of 50Ω, the terminal 15B functioning as output terminal for transmission and input terminal for reception of the transmitter amplifier 10 and the second matching circuit 50, and then is input to the mode switch 30.

In the mode switch 30, the switching FET 34 has been turned ON responsive to the control signal input through the switch-control-signal input terminal 32. Thus, the input received signal is next passed through the switching FET 34, the output terminal 33 of the mode switch 30 and the coupling capacitance 71 so as to be input to the first matching circuit 40.

Subsequently, the impedance of the input received signal is matched with the input impedance of the low-noise receiver amplifier 20 by the first matching circuit 40. Thereafter, the signal is input to the input terminal 21 of the low-noise receiver amplifier 20. At this point in time, by turning ON the high-power FET 12 upon the application of a control voltage to the control terminal 14 of the high-power FET 12 in the transmitter amplifier 10, the high-power FET 12 can be equivalent to pure resistance 12A as shown in FIG. 4. Thus, the circuit section on the transmission side can be short-circuited during reception. Accordingly, the input impedance of the low-noise receiver amplifier 20 can be matched by the first inductor 43 and the second inductor 44 constituting the first matching circuit 40 and the inductor 52 constituting the second matching circuit 50.

Next, the received signal input to the low-noise receiver amplifier 20 is amplified by the low-noise FET 22 and then output through the output terminal 23 of the low-noise receiver amplifier 20.

It is noted that, if the transmitter amplifier 10 performs multiple-stage amplification using a plurality of FETS, the control terminal 14 may be provided for the FET on the last amplification stage.

As can be understood, in this second embodiment, the resulting number of devices can be reduced, for example, by using the inductor 43 required for the first matching circuit 40 simultaneously as the inductor 52 in the second matching circuit 50 as shown in FIG. 4. As a result, the size of the first matching circuit 40 can be reduced.

That is to say, during reception, there is no problem if only impedance matching is realized between the antenna 80 and the low-noise receiver amplifier 20 by using the devices of the first matching circuit 40 and the second matching circuit. Thus, by comparison to the first embodiment, the design flexibility of the first matching circuit 40 can be increased.

For example, once the first matching circuit 40 is fixed, the first matching circuit 40 itself cannot be changed. However, even in such a case, by providing the output terminal 16 of the received signal at such a position of the second matching circuit 50 as to optimize the impedance matching with the low-noise receiver amplifier 20, the first matching circuit 40 can also be connected to the output terminal 16 of the received signal. Thus, the number of devices can be reduced simultaneously.

Herein, variations of the second matching circuit 50 and variations of the output terminal of the received signal at respective positions corresponding to the respective variations where impedance matching with the low-noise receiver amplifier 20 is optimized are illustrated in FIGS. 5 and 6. In the second matching circuit 50 shown in FIG. 5(*a*), the output terminal 16A of the received signal is connected to the connection point between the inductor 52 and the second capacitor 53. In the second matching circuit 50A shown in FIG. 5(*b*), the inductor is divided into two parts 52A and 52B, and the output terminal 16B of the received signal is connected to the drain electrode of a high-power FET 12

(not shown) and to a non-grounded terminal, i.e., a common terminal of the first capacitor 51. In the second matching circuit 50A shown in FIG. 5(*c*), the output terminal 16C of the received signal is connected to a common terminal of the inductors 52A and 52B. In the second matching circuit 50B shown in FIG. 5(*d*), one terminal of the inductor 52 is grounded and the other end thereof is connected to the drain electrode of the high-power FET 12 and to the non-grounded terminal, i.e., the common terminal of the first capacitor 51, to which terminal the output terminal 16D of the received signal is connected. In the second matching circuit 50C shown in FIG. 6(*a*), a second inductor 54 is newly added to the second matching circuit 50, one terminal of the second inductor 54 is grounded and the other end thereof is connected to the drain electrode of the high-power FET 12 and to the non grounded terminal, i.e., the common terminal of the first capacitor 51, to which terminal the output terminal 16E of the received signal is connected. In the second matching circuit 50C shown in FIG. 6(*b*), the output terminal 16F of the received signal is connected to the connection point between the inductor 52 and the second capacitor 53. In the second matching circuit SOD shown in FIG. 6(*c*), a third capacitor 55 is newly added to the second matching circuit 50C, one terminal of the third capacitor 55 is grounded and the other end thereof is connected to the connection point between the inductor 52 and the second capacitor 53, and the output terminal 16G of the received signal is connected to the drain electrode of a high-power FET 12 (not shown) and to a non-grounded terminal, i.e., a common terminal of the first capacitor 51. In the second matching circuit 50D shown in FIG. 6(*d*), the output terminal 16H of the received signal is connected to a common connection point among the inductor 52, the second capacitor 53 and the third capacitor 55.

Third Embodiment

Hereinafter, the third embodiment of the present invention will be described with reference to the drawings.

Figure 7:
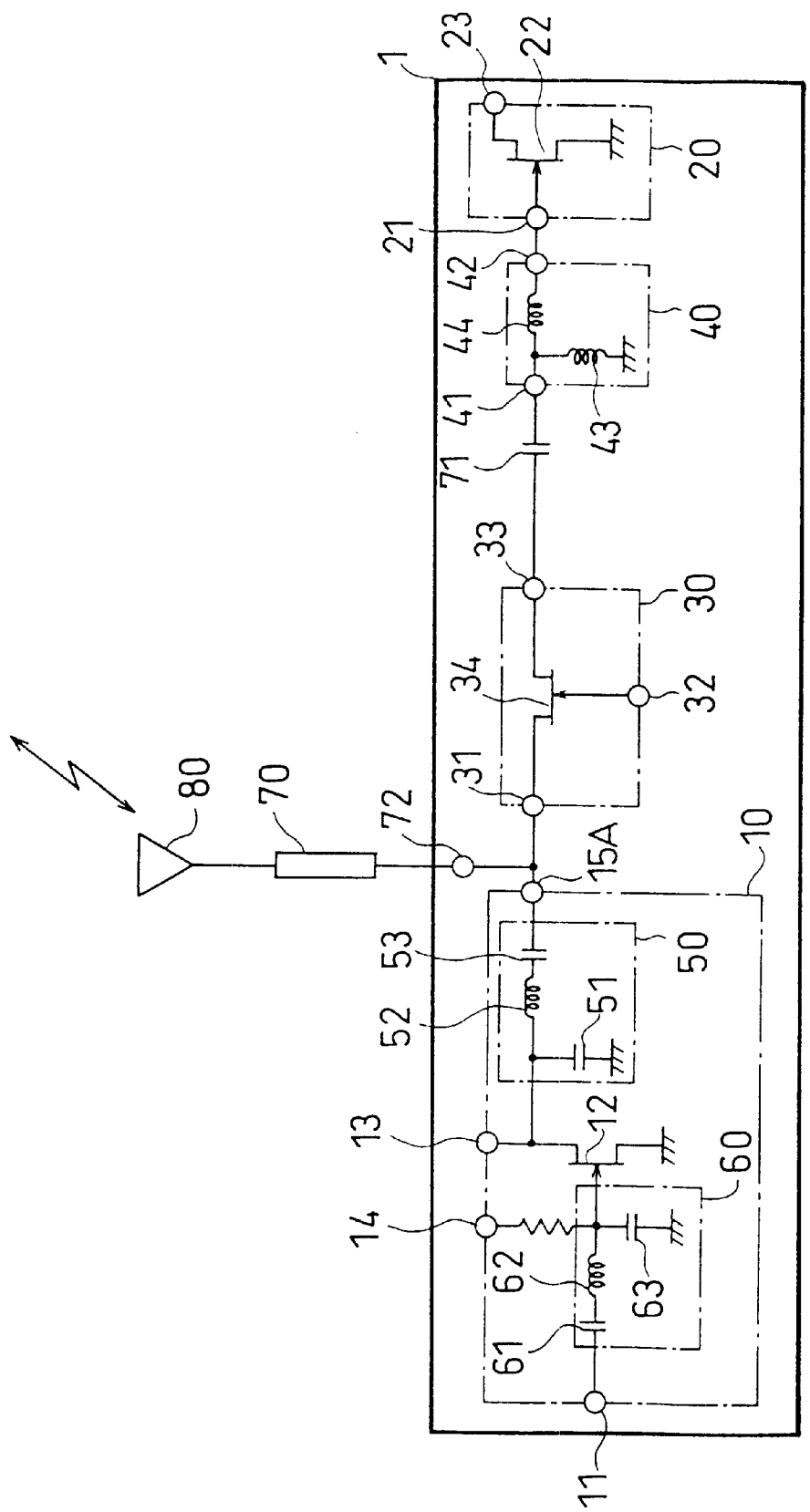
FIG. 7 is a circuit diagram of a transmitter-receiver circuit where GaAs FETs are used for a semiconductor integrated circuit device according to the third embodiment of the present invention.

FIG. 7 is a circuit diagram of a transmitter-receiver circuit where GaAs FETs are used for a semiconductor integrated circuit device according to the third embodiment of the present invention. That is to say, FIG. 7 is a circuit diagram of a device formed by integrating the transmitter-receiver circuit for a wireless communication unit as described in the first embodiment onto a semiconductor substrate.

In FIG. 7, 10 denotes a transmitter amplifier for amplifying an input signal to be transmitted and then outputting the amplified signal. 20 denotes a low-noise receiver amplifier for amplifying an input received signal and then outputting the amplified signal. 30 denotes a mode switch for switching transmission state and reception state in a time-division manner. 40 denotes a first matching circuit for matching the impedance of the input received signal with the input impedance of the low-noise receiver amplifier 20. 50 denotes a second matching circuit for matching the output impedance of the transmitter amplifier 10 with predetermined impedance. 60 denotes a third matching circuit for matching the impedance of the input signal to be transmitted with the input impedance of a high-power FET 12 of the transmitter amplifier 10. 70 denotes an interconnection, having characteristic impedance of 50Ω, for connecting an input/output terminal 72 on the antenna side to the antenna 80 used for both transmission and reception. 71 denotes coupling capacitance for ac coupling the mode switch 30 to the first matching circuit 40.

The respective circuits described above, i.e., the transmitter amplifier 10 including the second matching circuit 50 and the third matching circuit 60, the low-noise receiver amplifier 20, the mode switch 30 and the first matching circuit 40, are formed on a semiconductor substrate In the transmitter amplifier 10 shown in FIG. 7, 11 denotes an input terminal, through which a signal to be transmitted is input. 12 denotes a high-power FET, of which the gate electrode is provided with the input signal to be transmitted via the third matching circuit 60 and the source is grounded. 13 denotes a power supply terminal connected to the drain electrode of the high-power FET 12. 14 denotes a control terminal connected to the gate electrode of the high-power FET 12. 15A denotes a terminal functioning as output terminal on the transmission side and input terminal on the reception side, which is connected to the input/output terminal 72 on the antenna side and to the input terminal 31 of the mode switch 30.

In the low-noise receiver amplifier 20 shown in FIG. 7, 21 denotes an input terminal of the low-noise receiver amplifier 20, through which a received signal is input via the first matching circuit 40. 22 denotes a low-noise FET, of which the gate electrode is provided with the received signal and the source is grounded. 23 denotes an output terminal of the low-noise receiver amplifier 20 connected to the drain electrode of the low-noise FET 22.

In the mode switch 30 shown in FIG. 7, 31 denotes an input terminal connected to the antenna 80 through the interconnection 70 having characteristic impedance of 50Ω and to the output terminal 15 of the transmitter amplifier 10. 32 denotes a switch-control-signal input terminal for controlling a switching FET. 33 denotes an output terminal, through which the received signal, input through the antenna 80, is output. 34 denotes a switching FET constituting the mode switch 30. In FIG. 7, the same components as those of the respective matching circuits shown in FIG. 1 are identified by the same reference numerals and the description thereof will be omitted herein.

Since the operation of the semiconductor integrated circuit device according to this embodiment is the same as that of the first embodiment, the description thereof will be omitted herein.

In accordance with this embodiment, the transmitter amplifier 10 can be connected to the antenna 80 without interposing any switch therebetween by matching the inputs to the low-noise receiver amplifier 20 while using, in combination, the output impedance of the transmitter amplifier 10 during the OFF state and the output impedance of the first matching circuit 40 to the low-noise receiver amplifier 20. Thus, since the use of a switch for transmission is no longer necessary, it is possible to eliminate the pass loss that is ordinarily caused by a switching device on the output signal of the transmitter amplifier 10. As a result, the power consumption can be reduced during transmission.

In addition, since only one switching FET is required, the area occupied by the mode switch on the transmitter-receiver circuit can be narrowed, high integration is enabled. Ultimately, this fact can contribute to downsizing and cost reduction of a wireless communication unit incorporating the semiconductor integrated circuit device according to this embodiment.

In this embodiment, GaAs FETs are used as the FETs constituting the transmitter amplifier 10, the low-noise receiver amplifier 20 and the mode switch 30. Alternatively, these FETs may be silicon MOSFETs.

The value of resistance where the control terminal 14 of the high-power FET 12 is used as having been turned ON by applying a voltage to the control terminal 14 during the transmission OFF state is equal to or lower than 10, which is the ON resistance of a generally used FET. Thus, the influence of the resistance on the input matching of the low-noise receiver amplifier 20 is negligible.

Fourth Embodiment

Hereinafter, the fourth embodiment of the present invention will be described with reference to the drawings.

Figure 8:
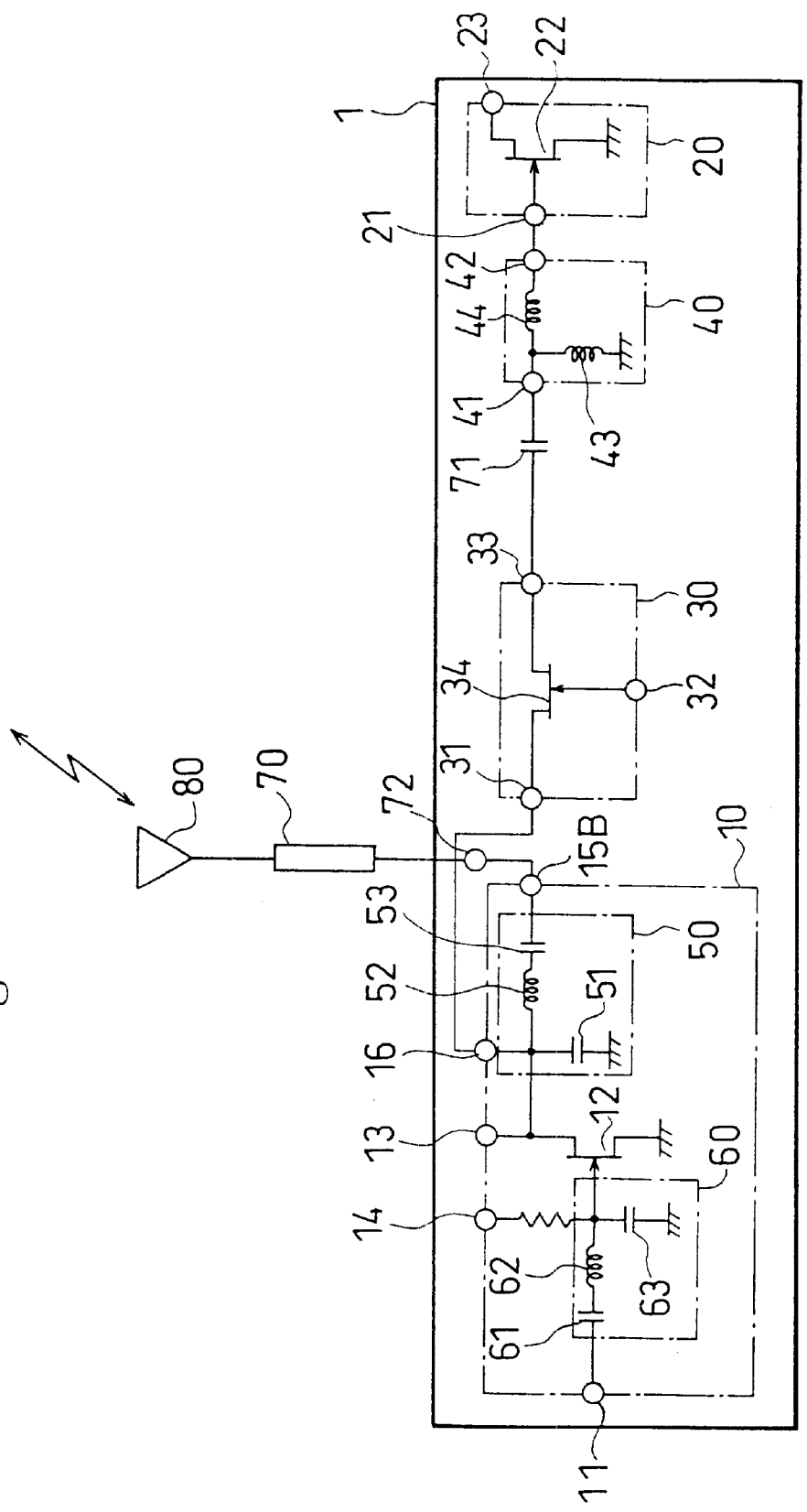
FIG. 8 is a circuit diagram of a transmitter-receiver circuit where GaAs FETs are used for a semiconductor integrated circuit device according to the fourth embodiment of the present invention.

FIG. 8 is a circuit diagram of a transmitter-receiver circuit where GaAs FETs are used for a semiconductor integrated circuit device according to the fourth embodiment of the present invention. That is to say, FIG. 8 is a circuit diagram of a device formed by integrating the transmitter-receiver circuit for a wireless communication unit as described in the second embodiment onto a semiconductor substrate.

In FIG. 8, 10 denotes a transmitter amplifier for amplifying an input signal to be transmitted and then outputting the amplified signal. 20 denotes a low-noise receiver amplifier for amplifying an input received signal and then outputting the amplified signal. 30 denotes a mode switch for switching transmission state and reception state in a time-division manner. 40 denotes a first matching circuit for matching the impedance of the input received signal with the input impedance of the low-noise receiver amplifier 20. 50 denotes a second matching circuit for matching the output impedance of the transmitter amplifier 10 with predetermined impedance. 60 denotes a third matching circuit for matching the impedance of the input signal to be transmitted with the input impedance of a high-power FET 12 of the transmitter amplifier 10. 70 denotes an interconnection, having characteristic impedance of 50Ω, for connecting an input/output terminal 72 on the antenna side to the antenna 80 used for both transmission and reception. 71 denotes coupling capacitance for ac coupling the mode switch 30 to the first matching circuit 40. It is noted that the s same components as those of the respective circuits shown in FIG. 3 are identified by the same reference numerals and the description thereof will be omitted herein.

The respective circuits described above, i.e., the transmitter amplifier 10 including the second matching circuit 50 and the third matching circuit 60, the low-noise receiver amplifier 20, the mode switch 30 and the first matching circuit 40, are formed on a semiconductor substrate 1.

The fourth embodiment is characterized in that the input terminal 31 of the mode switch 30 is not connected to the terminal 15B functioning as output terminal for transmission and input terminal for reception of the transmitter amplifier 10, but to the output terminal 16 of the received signal in the second matching circuit 50.

The operations thereof during reception and transmission are the same as those of the transmitter-receiver circuit as described in the second embodiment. Thus, the description thereof will be omitted herein.

In accordance with the fourth embodiment, by turning ON the high-power FET 12 upon the application of a control voltage to the control terminal 14 of the high-power FET 12 in the transmitter amplifier 10 shown in FIG. 8 and by using the high-power FET 12 as pure resistance 12A, the circuit section on the transmission side can be short-circuited and isolated during reception.

Thus, the resulting number of devices can be reduced by using the inductor required for the first matching circuit 40 simultaneously as the inductor 52 in the second matching circuit 50 as shown in FIG. 8. As a result, the size of the first matching circuit 40 can be reduced.

That is to say, during reception, there is no problem if only impedance matching is realized between the antenna 80 and the low-noise receiver amplifier 20 by using the devices of the first matching circuit 40 and the second matching circuit. Thus, by comparison to the third embodiment, the design flexibility of the first matching circuit 40 can be increased. For example, by providing the output terminal 16 of the received signal at such a position of the second matching circuit 50 as to optimize the impedance matching with the low-noise receiver amplifier 20, the input terminal 31 of the mode switch 30 can also be connected to the output terminal 16 of the received signal. Thus, the number of devices can be reduced simultaneously. In this case, it is naturally possible to apply the respective variations 50A through 50D of the second matching circuit 50 shown in FIGS. 5 and 6 and the respective variations of the output terminals 16A to 16H of the received signal corresponding to the respective variations.

In addition, since only one switching FET is required, the area occupied by the mode switch 30 and the first matching circuit 40 on the transmitter-receiver circuit can be narrowed, high integration is realized more easily. Ultimately, this fact can contribute more to downsizing and cost reduction of a wireless communication unit incorporating the semiconductor integrated circuit device according to this embodiment.

Fifth Embodiment

Hereinafter, the fifth embodiment of the present invention will be described with reference to the drawings.

Figure 9:
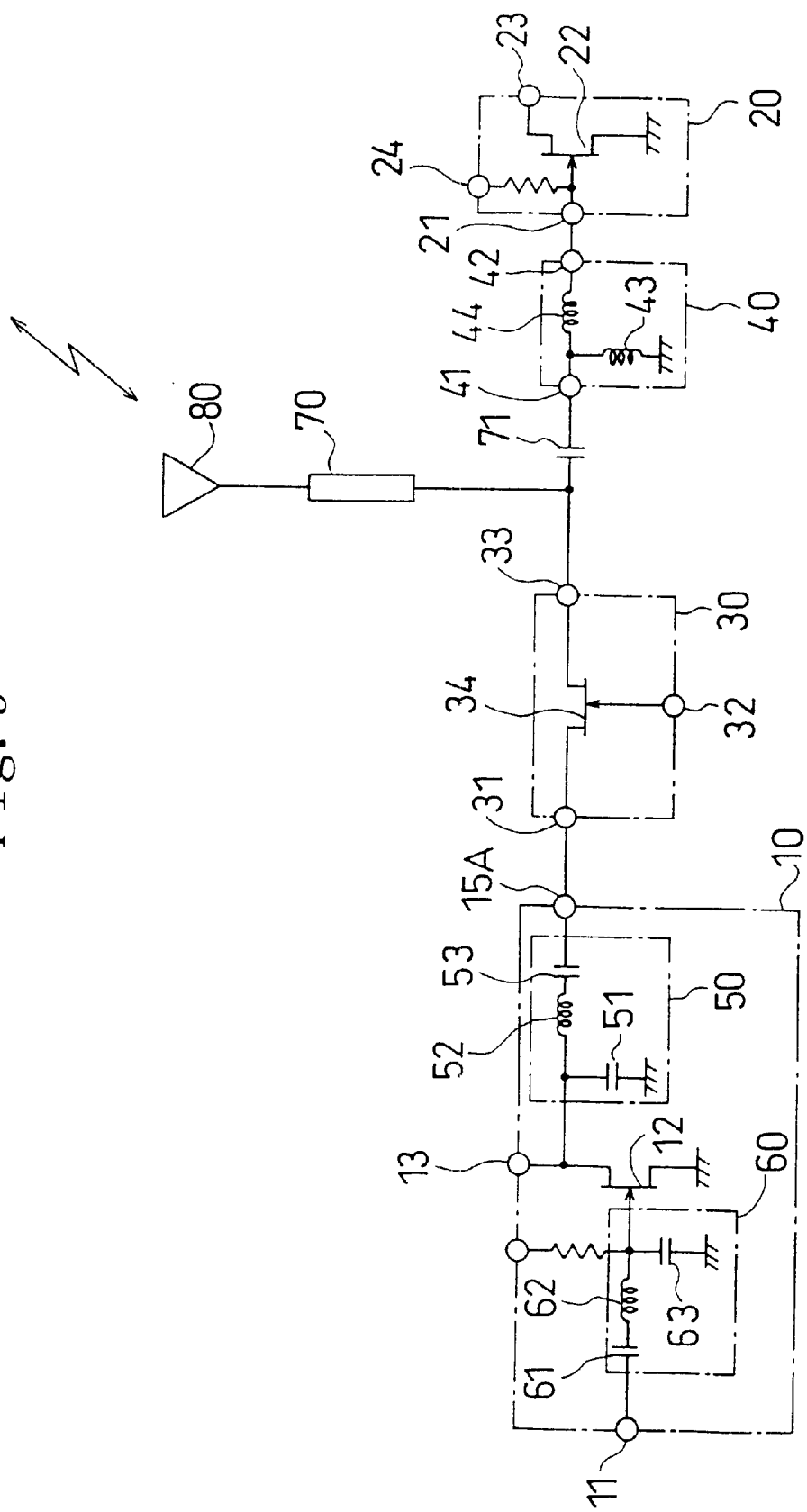
FIG. 9 is a circuit diagram of a transmitter-receiver circuit for a wireless communication unit according to the fifth embodiment of the present invention.

FIG. 9 is a circuit diagram of a transmitter-receiver circuit for a wireless communication unit according to the fifth embodiment of the present invention.

The fifth embodiment is characterized by the configuration in which the transmission/reception mode switch is not connected between the antenna and the low-noise receiver amplifier as is done in the foregoing embodiments, but is connected between the antenna and the transmitter amplifier. In FIG. 9, 10 denotes a transmitter amplifier for amplifying an input signal to be transmitted and then outputting the amplified signal. 20 denotes a low-noise receiver amplifier for amplifying an input received signal and then outputting the amplified signal. 30 denotes a mode switch for switching transmission state and reception state in a time-division manner. 40 denotes a first matching circuit for matching the impedance of the input received signal with the input impedance of the low-noise receiver amplifier 20. 50 denotes a second matching circuit for matching the output impedance of the transmitter amplifier 10 with predetermined impedance. 60 denotes a third matching circuit for matching the impedance of the input signal to be transmitted with the input impedance of a high-power FET 12 of the transmitter amplifier 10. 70 denotes an interconnection, having characteristic impedance of 50Ω, for connecting the mode switch 30, the first matching circuit 40 and an antenna 80 used for both transmission and reception to each other. 71 denotes coupling capacitance for ac coupling the mode switch 30 to the first matching circuit 40.

In the transmitter amplifier 10 shown in FIG. 9, 11 denotes an input terminal, through which a signal to be transmitted is input. 12 denotes a high-power FET, of which the gate electrode is provided with the input signal to be transmitted via the third matching circuit 60 and the source is grounded. 13 denotes a power supply terminal connected to the drain electrode of the high-power FET 112. 15A denotes an output terminal connected to the input terminal 31 of the mode switch 30.

In the low-noise receiver amplifier 20 shown in FIG. 9, 21 denotes an input terminal, through which a received signal is input via the coupling capacitance 71 and the first matching circuit 40. 22 denotes a low-noise FET, of which the gate electrode is provided with the received signal and the source is grounded. 23 denotes an output terminal connected to the drain electrode of the low-noise FET 22. 24 denotes a control terminal connected to the gate electrode of the low-noise FET 22.

In the mode switch 30 shown in FIG. 9, 31 denotes an input terminal connected to the output terminal 15 of the transmitter amplifier 10. 32 denotes a switch-control-signal input terminal for controlling a switching FET. 33 denotes an output terminal, through which the amplified signal to be transmitted is output to the antenna 80. 34 denotes a switching FET constituting the mode switch 30.

In the first matching circuit 40 shown in FIG. 9, 41 denotes an input terminal connected to the antenna 80 and to the output terminal 33 of the mode switch 30 via the coupling capacitance 71 and an interconnection having characteristic impedance of 50Ω. 42 denotes an output terminal connected to the input terminal 21 of the low-noise receiver amplifier 20. 43 denotes a first inductor, one end of which is connected to the input terminal 41 of the first matching circuit 40 and the other end of which is grounded, for constituting the first matching circuit 40. 44 denotes a second inductor, one end of which is connected to the input terminal 41 of the first matching circuit 40 and the other end of which is connected to the output terminal 42, for constituting the first matching circuit 40.

In the second matching circuit 50 shown in FIG. 1, 51 denotes a first capacitor, one end of which is connected to the drain electrode of the high-power FET and the other end of which is grounded, for constituting the second matching circuit 50. 52 denotes an inductor, one end of which is connected to the drain electrode of the high-power FET and the other end of which is connected to a second capacitor 53, for constituting the second matching circuit 50. 53 denotes a second capacitor, one end of which is connected to the inductor 52 and the other end of which is connected to the output terminal 15A of the transmitter amplifier 10, for constituting the second matching circuit 50.

All of the FETs constituting the transmitter amplifier 10, the low-noise receiver amplifier 20 and the mode switch 30 of this transmitter-receiver circuit are assumed to be GaAs FETs or silicon MOSFETs.

Hereinafter, the operation of the transmitter-receiver circuit having the above-described configuration will be described with reference to FIGS. 9 and 10.

Figure 10:
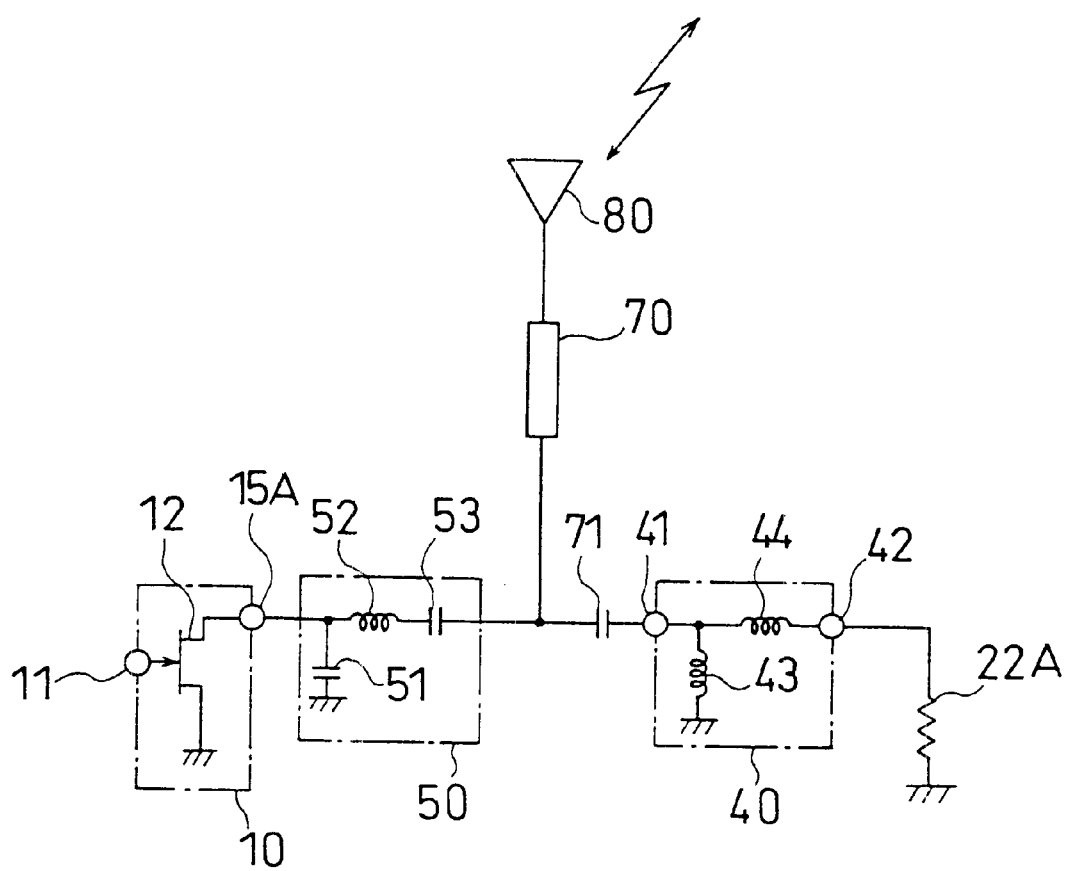
FIG. 10 is an equivalent circuit diagram where the transmitter-receiver circuit for a wireless communication unit according to the fifth embodiment of the present invention performs transmitting operation.
Figure 11:
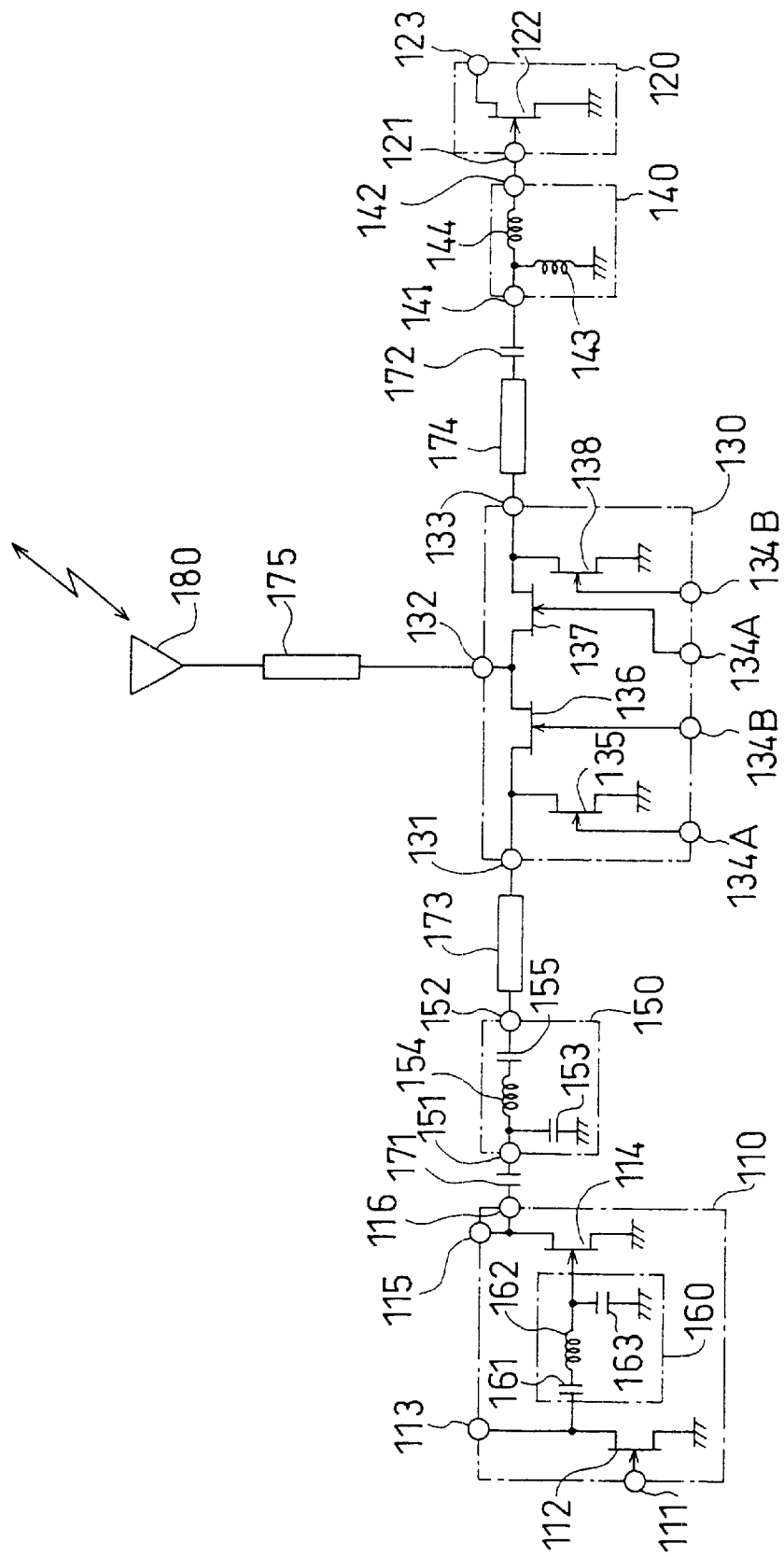
FIG. 11 is a circuit diagram of a conventional transmitter-receiver circuit of a digital type using FETs.

FIG. 10 is an equivalent circuit diagram where the transmitter-receiver circuit for a wireless communication unit according to the fifth embodiment of the present invention performs transmitting operation. In FIG. 10, the same components as those of the transmitter-receiver circuit shown in FIG. 9 are identified by the same reference numerals and the description thereof will be omitted herein.

First, the operation thereof during reception will be described.

A less intense received signal, which has been input through the antenna 80, passes through the interconnection 70 having characteristic impedance of 50Ω and is input to the first matching circuit 40 shown in FIG. 9 via the coupling capacitance 71.

Subsequently, the impedance of the input received signal is matched with the input impedance of the low-noise receiver amplifier 20 by the first matching circuit 40. Thereafter, the signal is input to the input terminal 21 of the low-noise receiver amplifier 20. The input received signal is amplified by the low-noise FET 22 and then output through the output terminal 23 of the low-noise receiver amplifier 20. Since the switching FET 34 has been turned OFF in the mode switch 30, the circuit section on the transmission side is isolated from the antenna 80 and the low-noise receiver amplifier 20.

Next, the operation thereof during transmission will be described.

First, a signal to be transmitted, which has been modulated and amplified to reach a predetermined signal level, is input to the input terminal 11 of the transmitter amplifier 10. Then, after the impedance of the input signal to be transmitted is matched by the third matching circuit 60 with the input impedance of the high-power FET 12, the input signal to be transmitted is amplified by the high-power FET 12 to gain desired power.

At this point in time, by turning ON the low-noise FET 22 upon the application of a positive voltage, which is equal to larger than Schottky voltage, to the control terminal 24 of the low-noise FET 22 in the low-noise receiver amplifier 20 shown in FIG. 9, the low-noise FET 22 can be equivalent to pure resistance 22A as shown in FIG. 10. Thus, the circuit section on the reception side can be short-circuited during transmission. Accordingly, the output impedance of the transmitter amplifier 10 can be matched with predetermined impedance by the first inductor 43 and the second inductor 44 constituting the first matching circuit 40 and the inductor 52 constituting the second matching circuit 50.

Next, the signal to be transmitted, subjected to the impedance matching, passes through the interconnection 70 having characteristic impedance of 50Ω and is input to the antenna 80 so as to be output through the antenna 80 as radio waves.

It is noted that the impedance matching should be performed between the first matching circuit and the second matching circuit so that the amplified signal to be transmitted does not flow toward the low-noise receiver amplifier 20.

As can be understood from the above description, in the fifth embodiment, the outputs of the transmitter amplifier 10 are matched by using, in combination, the impedance of the low-noise receiver amplifier 20 during the OFF state and the impedance of the second matching circuit 50 in the transmitter amplifier 10 whereby the low-noise receiver amplifier 20 can be connected to the antenna 80 without interposing any switch. As a result, since a switch for reception can be omitted, it is possible to eliminate the pass loss, which is ordinarily caused by a switch on the input signal of the low-noise receiver amplifier 20.

Furthermore, since the less intense received signal is not attenuated, the S/N ratio during amplification can be increased. Moreover, since only one switching FET is enough, a switch can be downsized and highly integrated.

INDUSTRIAL APPLICABILITY

As is apparent from the foregoing description, in the transmitter-receiver circuit for a wireless communication unit according to the present invention, the output terminal of the transmitter amplifier is directly connected to the antenna without passing through the mode switch during transmission. Thus, the pass loss, ordinarily caused by a switch on a signal to be transmitted, can be eliminated. As a result, the power consumption can be reduced. On the other hand, during reception, the circuit section on the transmission side is short-circuited by using the FET for transmission amplification as resistance. As a result, a mode switch on the transmission side is no longer necessary. In other words, a mode switch on the reception side may be constituted by only one switching device, and thus the area occupied by the mode switch in the entire circuit can be reduced. Consequently, the overall size of the transmitter-receiver circuit can be reduced.

On the other hand, since the semiconductor integrated circuit device according to the present invention is constituted by the transmitter-receiver circuit for a wireless communication unit according to the present invention, the power consumption during transmission can be reduced and the overall size of the transmitter-receiver circuit can be reduced. Thus, the present invention is advantageous for even higher integration. As a result, the costs of a semiconductor integrated circuit device can be reduced.

What is claimed is:

1. A transmitter-receiver circuit for a wireless communication unit, comprising:

a transmitter amplifier for amplifying and outputting an input signal to be transmitted;

a receiver amplifier for amplifying and outputting an input received signal; and a mode switch, connected to an antenna used for both transmission and reception, for switching a transmission state where the signal to be transmitted, which has been output by the transmitter amplifier, is output to the antenna and a reception state where the received signal, to be input to the receiver amplifier, is input through the antenna, characterized in that the transmitter amplifier includes:

an amplifying FET, having a gate electrode connected to an input terminal of the signal to be transmitted, a drain electrode connected to a power supply terminal and a source electrode grounded;

a matching circuit, connected between the drain electrode of the FET and the antenna, for matching output impedance of the FET with impedance on an antenna side;

a control terminal connected to the gate electrode of the FET; and an output terminal directly connected to the antenna without passing through the mode switch.

2. A transmitter-receiver circuit for a wireless communication unit, comprising:

a transmitter amplifier for amplifying and outputting an input signal to be transmitted;

a receiver amplifier for amplifying and outputting an input received signal; and a mode switch, connected to an antenna used for both transmission and reception, for switching a transmission state where the signal to be transmitted, which has been output by the transmitter amplifier, is output to the antenna and a reception state where the received signal, to be input to the receiver amplifier, is input through the antenna, characterized in that the transmitter amplifier includes:

an amplifying FET, having a gate electrode connected to an input terminal of the signal to be transmitted, a drain electrode connected to a power supply terminal and a source electrode grounded;

a matching circuit, connected between the drain electrode of the FET and the antenna, for matching output impedance of the FET with impedance on an antenna side;

a control terminal connected to the gate electrode of the FET; and an output terminal directly connected to the antenna without passing through the mode switch, and that an input terminal on the antenna side of the mode switch is connected to a terminal of the matching circuit, which is different from an output terminal of the signal to be transmitted of the matching circuit.

3. A semiconductor integrated circuit device, comprising:

a semiconductor substrate;

a transmitter amplifier, formed on the semiconductor substrate, for amplifying and outputting an input signal to be transmitted;

a receiver amplifier, formed on the semiconductor substrate, for amplifying and outputting an input received signal; and a mode switch, formed on the semiconductor substrate and connected to an input/output terminal on an antenna side used for both transmission and reception, for switching a transmission state where the signal to be transmitted, which has been output by the transmitter amplifier, is output to the input/output terminal on the antenna side and a reception state where the received signal, to be input to the receiver amplifier, is input through the input/output terminal on the antenna side, characterized in that the transmitter amplifier includes:

an amplifying FET, having a gate electrode connected to an input terminal of the signal to be transmitted, a drain electrode connected to a power supply terminal and a source electrode grounded;

a matching circuit, connected between the drain electrode of the FET and the input/output terminal on the antenna side, for matching output impedance of the FET with impedance on the antenna side;

a control terminal connected to the gate electrode of the FET; and an output terminal directly connected to the input/output terminal on the antenna side without passing through the mode switch.

4. A semiconductor integrated circuit device, comprising:

a semiconductor substrate;

a transmitter amplifier, formed on the semiconductor substrate, for amplifying and outputting an input signal to be transmitted;

a receiver amplifier, formed on the semiconductor substrate, for amplifying and outputting an input received signal; and a mode switch, formed on the semiconductor substrate and connected to an input/output terminal on an antenna side used for both transmission and reception, for switching a transmission state where the signal to be transmitted, which has been output by the transmitter amplifier, is output to the input/output terminal on the antenna side and a reception state where the received signal, to be input to the receiver amplifier, is input through the input/output terminal on the antenna side, characterized in that the transmitter amplifier includes:

an amplifying FET, having a gate electrode connected to an input terminal of the signal to be transmitted, a drain electrode connected to a power supply terminal and a source electrode grounded;

a matching circuit, connected between the drain electrode of the FET and the input/output terminal on the antenna side, for matching output impedance of the FET with impedance on the antenna side;

a control terminal connected to the gate electrode of the FET; and an output terminal directly connected to the input/output terminal on the antenna side without passing through the mode switch, and that an input terminal on the antenna side of the mode switch is connected to a terminal of the matching circuit, which is different from an output terminal of the signal to be transmitted of the matching circuit.

* * * * *